United States Patent
Huang et al.

(10) Patent No.: US 9,949,565 B1
(45) Date of Patent: Apr. 24, 2018

(54) SUPPORTING ASSEMBLY AND FURNITURE COMPRISING THE SAME

(71) Applicant: MINIWIZ CO., LTD., Taipei (TW)

(72) Inventors: Chian-Chi Huang, Taipei (TW); Tzu-Wei Liu, Taipei (TW); Yu-Hung Tarn, Taipei (TW); Yi-Chun Chang, Taipei (TW); Johann Joseph Alexej Boedecker, Berlin (DE); James Edward Hall, Berlin (DE); Bjorn Schlingmann, Berlin (DE)

( * ) Notice: Subject to any disclaimer, the term of this patent is extended or adjusted under 35 U.S.C. 154(b) by 0 days.

(21) Appl. No.: 15/623,605

(22) Filed: Jun. 15, 2017

(51) Int. Cl.
| | |
|---|---|
| *F16M 11/16* | (2006.01) |
| *A47B 91/02* | (2006.01) |
| *A47C 3/36* | (2006.01) |
| *A47B 9/16* | (2006.01) |

(52) U.S. Cl.
CPC .............. *A47B 91/02* (2013.01); *A47B 9/16* (2013.01); *A47C 3/36* (2013.01)

(58) Field of Classification Search
CPC ............ F16M 2200/024; F16M 11/16; F16M 11/242; F16M 11/38; F16C 11/10
See application file for complete search history.

(56) References Cited

U.S. PATENT DOCUMENTS

| | | | | |
|---|---|---|---|---|
| 4,614,452 A * | 9/1986 | Wang | .......... | F16B 7/04 403/146 |
| 4,917,343 A * | 4/1990 | Wainscott | .............. | A47B 23/06 248/284.1 |
| 5,060,894 A * | 10/1991 | Hillinger | ................. | F16C 11/10 211/203 |
| 6,988,701 B1 * | 1/2006 | Lin | .......... | F16C 11/10 248/514 |
| 7,252,272 B2 * | 8/2007 | Hsiung | ................... | B60R 11/02 248/278.1 |
| 7,540,466 B2 * | 6/2009 | Yang | ....................... | F16M 11/10 248/126 |
| 8,074,956 B2 * | 12/2011 | Wang | ..................... | F16M 13/00 248/133 |
| 8,514,568 B2 * | 8/2013 | Qiao | ...................... | F16M 11/10 248/917 |
| 9,399,882 B1 * | 7/2016 | McGrath | ............. | E05D 11/1007 |
| 9,416,914 B1 * | 8/2016 | Fan | ....................... | F16M 11/105 |
| 2006/0157627 A1 * | 7/2006 | Hung | ..................... | F16C 11/10 248/276.1 |
| 2006/0285915 A1 * | 12/2006 | Dellach | ................... | F16C 11/10 403/92 |
| 2016/0192778 A1 * | 7/2016 | Shen | .................... | F16M 13/022 108/42 |

* cited by examiner

*Primary Examiner* — Bradley Duckworth

(57) ABSTRACT

Disclosed herein is a supporting assembly that allows easy assembly of a furniture. The supporting assembly includes structures that employ easy-to-use locking mechanism so that a user may assemble a furniture at desirable configuration without using a tool.

13 Claims, 4 Drawing Sheets

SUPPORTING ASSEMBLY AND FURNITURE COMPRISING THE SAME

BACKGROUND OF THE INVENTION

1. Field of the Invention

The present disclosure relates to a supporting assembly and a furniture comprising the same. More particularly, the disclosed invention relates to a supporting assembly that allows easy assembly of a furniture.

2. Description of Related Art

Furniture assembling is often time-consuming and labor-intensive, and generally involves the use of certain tools. Furthermore, once installed, it is not easy to rearrange or readjust the configuration of the furniture. Accordingly, the installation, rearrangement, and adjustment of the furniture pose a heavy burden to the personnel involved in such tasks.

In view of the foregoing, there exists in the art a need of a supporting structure and/ or furniture, which may be reassembled easily and efficiently in accordance with the actual needs.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

In one aspect, the present disclosure is directed to a supporting assembly that allows easy assembly of a furniture, such as a chair, a cabinet and etc. The present supporting assembly includes structures that employ easy-to-use locking mechanism so that a user may assemble a furniture at desirable configuration without using a tool.

The supporting assembly consists essentially of a shaft member, two base members, and two locking members. Specifically, the shaft member has a shaft, a plurality of a first teeth and a plurality of a second teeth, wherein the plurality of the first and second teeth are respectively disposed at and surrounding the outer surface of the shaft, and adjacent to each other. Each base members includes a first loop structure formed at one end of the base member; one or two legs extended from the first loop structure; and a plurality of a third teeth disposed at and surrounding the inner surface of the first loop structure for engaging the plurality of the first or second teeth. The two locking members are respectively configured to lock the two base members to the shaft.

According to one embodiment of the present disclosure, the supporting assembly further comprises two fixing members. Each fixing members includes a second loop structure having a plurality of a fourth teeth disposed at and surrounding the outer surface of the second loop structure, wherein the plurality of the fourth teeth are configured to engage with the plurality of the third teeth of the base members.

According to another embodiment of the present disclosure, the two locking members are respectively threaded onto the opposite ends of the shaft.

In another embodiment, the supporting assembly further comprises a graduation disposed on any of the first loop structure of the supporting member.

In another aspect, the present disclosure is directed to a furniture constructed by the supporting assembly in accordance with any embodiment described above. The furniture comprises at least one of the present supporting assembly, and a furniture body coupled with the fixing members of the supporting assembly. In one example, the furniture is constructed and assembled by use of two supporting assemblies of the present disclosure to hold the furniture body, in which each supporting assemblies comprises two legs extended therefrom. In another example, the furniture is constructed and assembled by use of one supporting assembly of the present disclosure to hold the furniture body, in which the supporting assembly comprises three legs extended therefrom.

In another aspect, the present disclosure is directed to a chair. The chair consists essentially of: one supporting assembly of the present disclosure, a seat supporting member, and a chair shell. The chair shell is coupled to the seat supporting member, which comprises a connecting portion for coupling to the matching structure of the supporting assembly of the present disclosure. According to preferred embodiments, the chair shell is coupled to the seat supporting member via use of nuts and bolts.

According to optional embodiments of present disclosures, the supporting assembly, the furniture or the chair described in any embodiments of present invention is made of polyethylene terephthalate (PET), particularly, recycled PET.

Many of the attendant features and advantages of the present disclosure will becomes better understood with reference to the following detailed description considered in connection with the accompanying drawings.

BRIEF DESCRIPTION OF THE DRAWINGS

The present description will be better understood from the following detailed description read in light of the accompanying drawings, where.

Figure 1:
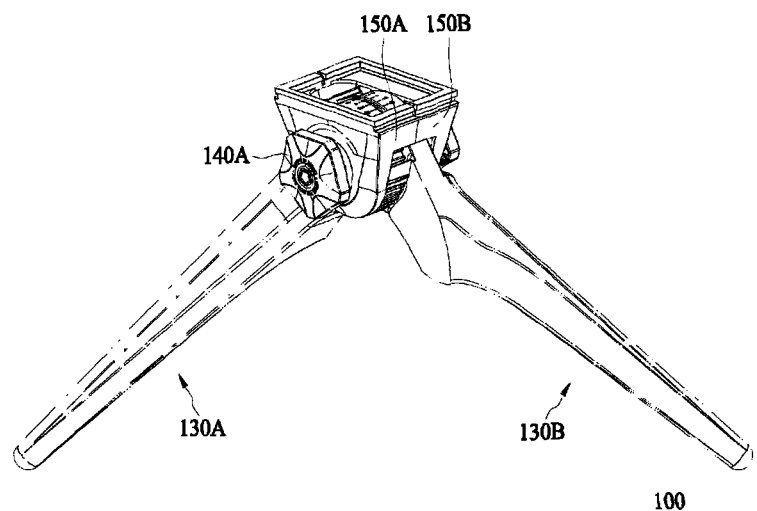
FIG. 1 is a schematic drawing illustrating a supporting assembly 100 in accordance with one embodiment of present invention.

In accordance with common practice, the various described features/elements are not drawn to scale but instead are drawn to best illustrate specific features/elements relevant to the present invention. Also, like reference numerals and designations in the various drawings are used to indicate like elements/parts.

DESCRIPTION OF THE INVENTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

For convenience, certain terms employed in the specification, examples and appended claims are collected here. Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include the singular. Specifically, as used herein and in the claims, the singular forms "a" and "an" include the plural reference unless the context clearly indicates otherwise. Also, as used herein and in the claims, the terms "at least one" and "one or more" have the same meaning and include one, two, three, or more.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques.

One aspect of the present disclosure is directed to a supporting assembly, which is configured to simplify the process of assembling a furniture by eliminating the need of a tool, while allowing the users to easily adjust the configuration of the furniture.

Figure 2:
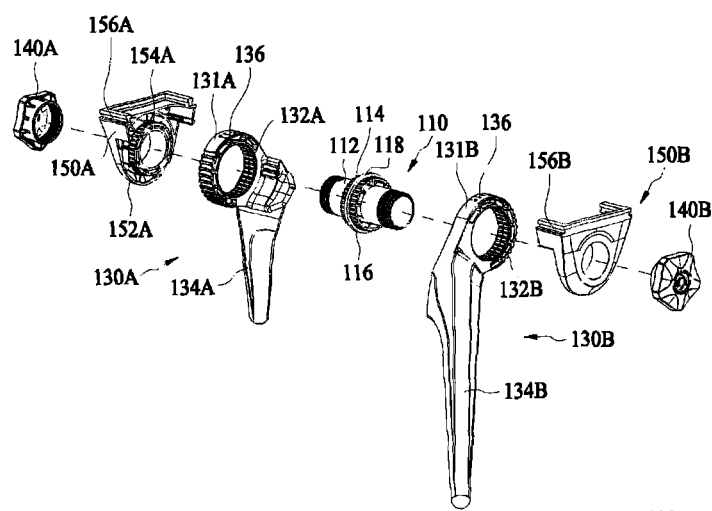
FIG. 2 is an exploded view of the supporting assembly 100 of FIG. 1.

References are made to both FIGS. 1 and 2, in which FIG. 1 is a schematic presentation of a supporting assembly 100 in accordance with one preferred embodiment of the present disclosure, and FIG. 2 is an exploded view thereof.

The supporting assembly 100 comprises in its structure, a shaft member 110, two base members (130A, 130B), and two locking members (140A, 140B). The shaft member 110 includes a shaft 112, and a plurality of a first and second teeth (114, 116) respectively disposed at and surrounding the outer surface of the shaft 112 and adjacent to each other. A pacer 118 may be disposed between the plurality of the first and second teeth (114, 116). Alternatively, the first and second teeth (114, 116) may be disposed right next to each other without the presence of the spacer 118.

Each of the base members (130A, 130B) comprises in its structure, a first loop structure (131A or 131B) formed at one end of the base member (130A, 130B) and at least one leg (134A or 134B) extending from the first loop structure (132A or 132B) for supporting the furniture to be assembled thereon. In the embodiment illustrated in FIG. 2, each base members (130A, 130B) is depicted as having only one leg (134A, 134B) extended from the first loop structure (131A or 131B). Additionally and optionally, each base members may have two legs extended from the first loop structure. In general, when assembling a furniture, two base members respectively having the same number of legs (i.e., 1 or 2) are used to form the preset supporting assembly. Additionally or alternatively, a base member having one leg may be assembled with another base member having two legs, thereby forming a supporting assembly that comprises 3 legs. In addition, each base members (130A, 130B) also has a plurality of a third teeth (132A, 132B) disposed at and surrounding the inner surface of the first loop structure (131A or 131B) for engaging the plurality of the first or second teeth (114, 116) on the outer surface of the shaft 112. It is worthy to note that in the present disclosure, the base members do not pivot around the shaft, instead, each base members is locked at certain position by the engaged teeth, such as the engagement between the third teeth and the first or second teeth. This specific locking mechanism also allows the respective legs (134A, 134B) of the base members (130A, 130B) to be positioned at any desired or predetermined angle, which is not limited to any particular range, as long as the assembly provide sufficient support to the furniture to be assembled thereon. Optionally, the supporting assembly 100 may further comprise a graduation 136 disposed on one or both of the first loop structures (131A, 131B) to allow the user to adjust the afore-described angle using the graduation 136 as a guide.

Additionally, the supporting assembly 100 further includes two fixing members (150A, 150B), each serves the purpose of strengthening the engagement between the base member and the shaft. The two fixing members (150A, 150B) are substantially mirrored in their structures. Take the fixing member 150A as an example, it has a second loop structure 152A and a plurality of fourth teeth 154A disposed at and surrounding the outer surface of the second loop structure 152A. The plurality of the fourth teeth 154A are configured to engage with the plurality of the third teeth (132A or 132B) of the base member (130A, 130B), so as to further strengthen the engagement between the base members (130A, 130B) and the shaft 112. In addition, each fixing members (150A or 150B) further includes in its structure a coupling portion, such as grooves (156A, 156B) as depicted in FIG. 2, for coupling to the matching structures in the furniture to be assembled thereon.

Additionally and optionally, the locking members (140A, 140B) of the supporting assembly 100 are respectively configured to secure the base members (130A, 130B) and the fixing members (150A, 150B) to the shaft 112, so that all members are locked and fixed, thereby forming the supporting assembly 100 as depicted in FIG. 1, which is useful for assembling furniture.

It is worthy to note that the first, second, third and fourth teeth described above may respectively have the same or different numbers of teeth, as long as the matching pair of teeth respectively comprises the same number of teeth. Specifically, the third teeth have the same number of teeth as that in the first or second teeth, while the fourth teeth have teeth that match to those of the third teeth. According to optional embodiments of the present disclosure, the first and second teeth (114, 116) may respectively have at least 12 teeth, such as 12, 13, 14, 15, 16, 17, 18, 19, 20, 21, 22, 23, 24, 25, 26, 27, 28, 29, 30, 31, 32, 33, 34, 35, 36, 37, 38, 39, and 40. In one example, the first and second teeth (114, 116) respectively have 24 teeth. In another example, the first and second teeth (114, 116) respectively have 36 teeth.

Furthermore, in order to support the weight of the body of a furniture to be assembled thereon, as well as to provide stability during use, the present supporting assembly shall be made of a material with sufficient mechanical strength so that it resists bending and breaking. Additionally, it is desirable to keep the supporting assembly as light as possible so that it is not too heavy or awkward for an average user to move the furniture around. In one embodiment, the supporting assembly is made of a recycled material, such as a recycled polyethylene terephthalate (recycled PET). In other embodiments, other types of recycled materials and/or their combination may also be used, depending on the desired strength and weight of the supporting assembly.

Figure 3:
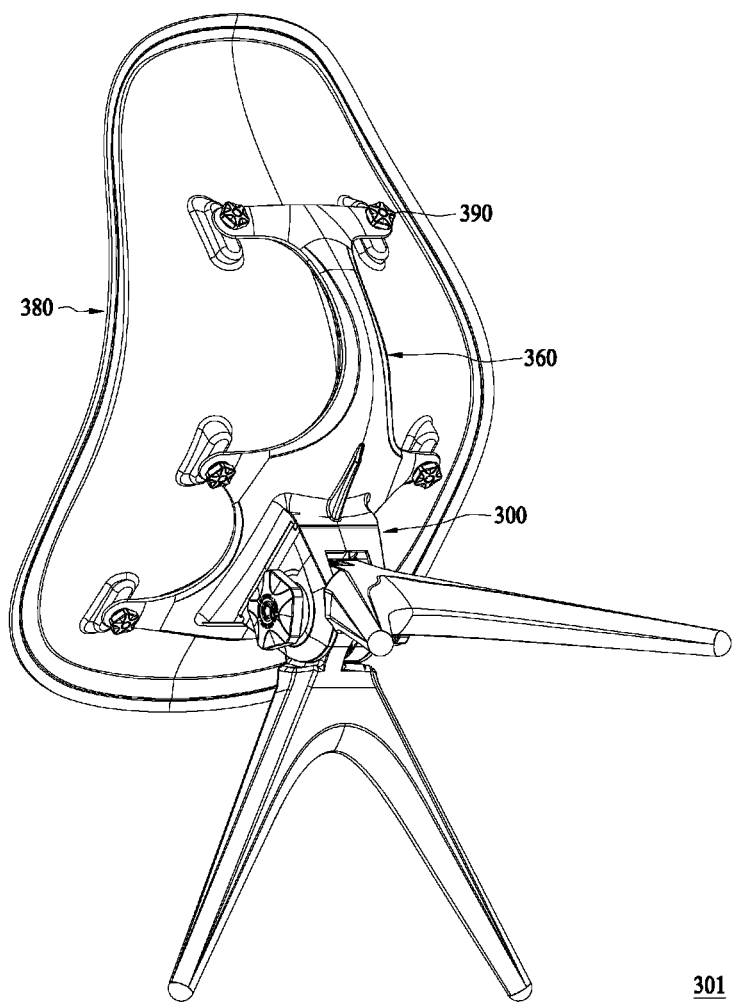
FIG. 3 is a schematic drawing of a chair 301 in accordance with one embodiment of present invention.
Figure 4:
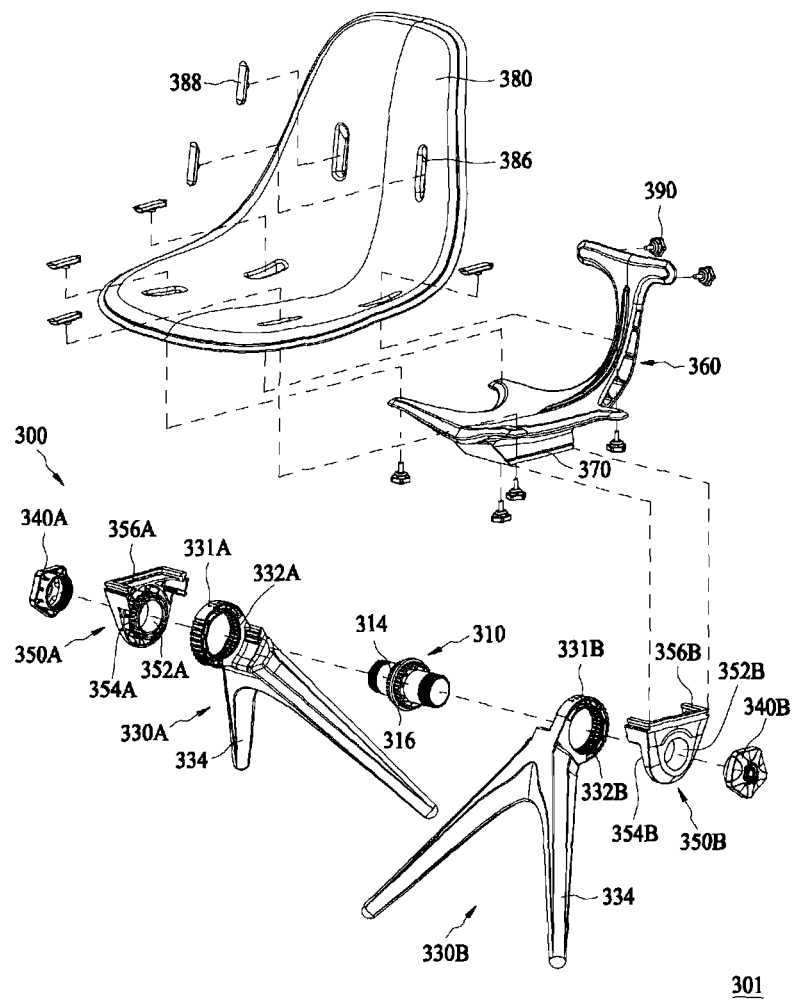
FIG. 4 is an exploded view of the chair 301 of FIG. 3.

References are now made to FIGS. 3 and 4, in which FIG. 3 is a schematic presentation of a chair 301 supported and assembled by the present supporting assembly; and FIG. 4 is an exploded view of FIG. 3.

As depicted in FIG. 3, the chair 301 comprises essentially of: a seat supporting member 360, a chair shell 380, and a supporting assembly 300, in which the chair shell 380 is coupled to the seat supporting member 360, which in term is supported by the supporting assembly 300.

To assemble the chair 301, members/components of the supporting assembly 300 as depicted in FIG. 4 are assembled in accordance with the same manner described in paragraphs relating to FIG. 2. Then, the chair shell 380 is coupled to the seat supporting member 360 by any suitable means, such as nuts and bolts 390. Finally, the assembly consists of the chair shell 380 and the seat supporting member 360 is coupled to the supporting assembly 300, thereby producing the assembled chair 301.

Reference is now made to FIG. 4. The supporting assembly 300 comprises components/members as depicted in FIGS. 1 and 2, except in this embodiment, instead of having one leg, each base members (330A, 330B) has two legs 334 extended therefrom. To assemble the supporting assembly 300, first allowing the respective first loop structures (331A, 331B) of the base members (330A, 330B) to pass through the opposite ends of the shaft member 310; then, engaging the third teeth (332A, 332B) of each base members (330A, 330B) with the first or second teeth (314, 316) of the shaft member 310 thereby allowing the base members (330A, 330B) to be tightly coupled with the shaft member 310. Next, allowing the respective second loop structures (352A, 352B) of the fixing members (350A, 350B) to pass through the opposite ends of the shaft member 310 and rest next to the base members, engaging the fourth teeth (354A, 354B) of the fixing members (350A, 350B) with the third teeth (332A, 332B) of the base members (330A, 330B) thereby allowing the fixing members (350A, 350B) to be tightly coupled to the base members (330A, 330B) and the shaft member 310. Finally, two locking members (340A, 340B) are respectively threaded onto the opposite ends of the shaft member 310, and thereby allowing the components/members of the supporting assembly 300 to be tightly secured in places. To couple the chair shell 380 with the seat supporting member 360, at least six pairs of nuts 388 and bolts 390 are employed to tightly secure the seat supporting member 360 onto the respective slots 386 of the chair shell 380. Then, the assembly (i.e., the chair shell 380 and the seat supporting member 360) is coupled to the assembled supporting assembly 300 via engaging the coupling portion (356A, 356B) of the fixing members (350A, 350B) with the matching structures or the connecting portion 370 in the seat supporting member 360. As illustrated in FIG. 4, the connecting portion 370 of in the seat supporting member 360 is depicted as a rib, that is removably fitted with the grooves (356A, 356B) of the fixing members (350A, 350B). It should be noted that there must be a sufficient area of the connecting portion 370 that comes into contact with the fixing member 350 of the supporting assembly 300 so as to support the weight of an user when sitting on the chair 301.

Moreover, the structures of the connecting portion 370 and the grooves (356A and 356B) of the fixing members (350A and 350B) may be modified by those with ordinary skill without departing from the scope of the claimed invention. For example, the top portion of the fixing member may comprise a plurality of blocks, and the connecting portion 370 may comprise a plurality of recesses corresponding to the blocks.

In addition, the seat supporting member 360, like the chair shell 380 and the supporting assembly 300, has been designed to provide maximum strength and flexibility while at the same time presenting an aesthetically pleasing appearance. In one embodiment, the seat supporting member 360, the chair shell 380 and/or the supporting assembly 300 are made of a recycled material, such as recycled PET.

The present supporting assembly in accordance with any embodiments described above may be used to assemble various types of furniture, which include but are not limited to, a chair, a cabinet, a table and etc. Examples of furniture supported and assembled by the present supporting assembly are provided in FIGS. 5 and 6.

Figure 5:
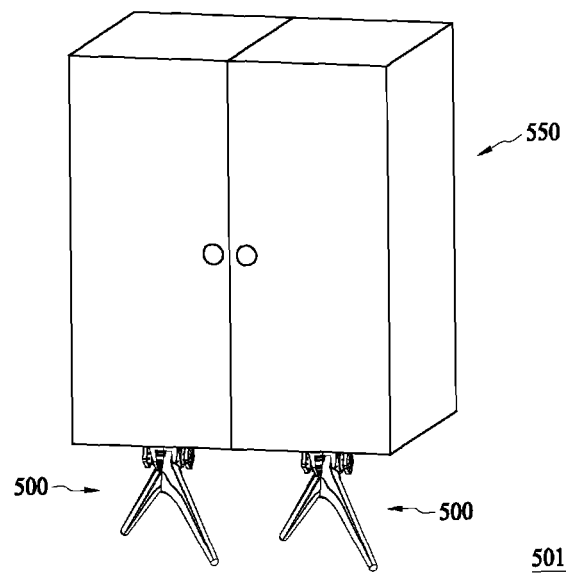
FIG. 5 is a schematic drawing illustrating a cabinet 501 supported and assembled by use of two supporting assembly in accordance with one embodiment of present invention.

FIG. 5 is a schematic presentation illustrating a cabinet 501 assembled and supported by two supporting assemblies 500 of the present disclosure. In this embodiment, the body of the cabinet 501 is supported by to two supporting assemblies 500, which respectively comprise two legs, to evenly distribute the weight of the cabinet body 550.

Figure 6:
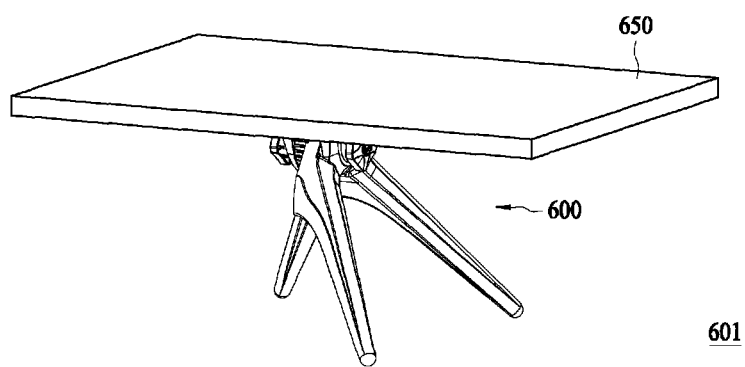
FIG. 6 is a schematic drawing illustrating a table 601 supported and assembled by use of one supporting assembly in according with another embodiment of present invention.

FIG. 6 is another schematic drawing illustrating a table 601 assembled and supported by one supporting assembly 600 of the present disclosure. In is this embodiment, the body of the table 650 is supported by one supporting assembly 600, which comprises two base members respectively having 1 and 2 legs extended therefrom.

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of present invention.

What is claimed is:

1. A supporting assembly, consisting essentially of:
   a shaft member comprising:
      a shaft;
      a plurality of a first teeth disposed at and surrounding the outer surface of the shaft; and
      a plurality of a second teeth disposed at and surrounding the outer surface of the shaft and adjacent to the first teeth;
   two base members, in which each base members comprises:
      a first loop structure formed at one end of the base member and has a plurality of a third teeth disposed at and surrounding the inner surface of the first loop structure for engaging the plurality of the first or second teeth; and
      one or two legs extended from the first loop structure; and
   two locking members respectively configured to lock the two base members to the shaft.

2. The supporting assembly of the claim 1, further comprising two fixing members, in which each fixing members comprises:
   a second loop structure having a plurality of a fourth teeth disposed at and surrounding the outer surface of the second loop structure, wherein the plurality of the fourth teeth are configured to engage with the plurality of the third teeth.

3. The supporting assembly of the claim 1, wherein the two locking members are respectively threaded onto the opposite ends of the shaft.

4. The supporting assembly of the claim 1, further comprising a graduation disposed on the first loop structure of any of the two base members.

5. The supporting assembly of the claim 1, wherein the supporting assembly is made of recycled polyethylene terephthalate.

6. A furniture, comprising:
   at least one of the supporting assembly of claim 2; and
   a furniture body coupled with the two fixing members of the supporting assembly.

7. The furniture of the claim 6, wherein the furniture body is a cabinet or a table top.

8. The furniture of the claim 7, wherein the furniture body is the cabinet, and the furniture comprises two support assemblies respectively coupled with the base portion of the cabinet.

9. The furniture of the claim 7, wherein the furniture body is the table top, and one of the two base members of the supporting assembly has one leg, while the other base member of the supporting assembly has two legs.

10. A chair, consisting essentially of:
    the supporting assembly of claim 2; and
    a seat supporting member having a connecting portion for coupling with the fixing member; and
    a chair shell coupled with the seat supporting member.

11. The chair of claim 10, wherein the supporting assembly further comprises a graduation disposed on the first loop structure of any of the two base members.

12. The chair of claim 10, wherein the chair shell is made of recycled polyethylene terephthalate.

13. The chair of claim 10, wherein the chair shell is coupled with the seat supporting member by nuts and bolts.

* * * * *